United States Patent
Broussard et al.

(10) Patent No.: US 12,547,910 B2
(45) Date of Patent: Feb. 10, 2026

(54) DISTRIBUTING STRUCTURE RISK ASSESSMENT USING INFORMATION DISTRIBUTION STATIONS

(71) Applicant: FlameMapper, LLC, Agoura Hills, CA (US)

(72) Inventors: Shea A. Broussard, Agoura Hills, CA (US); Oliver J. Curtis, Washington, DC (US); Anthony Shafer, Malibu, CA (US)

(73) Assignee: FlameMapper, LLC, Agoura Hills, CA (US)

( * ) Notice: Subject to any disclaimer, the term of this patent is extended or adjusted under 35 U.S.C. 154(b) by 1092 days.

(21) Appl. No.: 17/304,365

(22) Filed: Jun. 18, 2021

(65) Prior Publication Data

US 2022/0405610 A1 Dec. 22, 2022

(51) Int. Cl.
| | |
|---|---|
| *G06N 5/04* | (2023.01) |
| *G06K 19/06* | (2006.01) |
| *G06N 20/00* | (2019.01) |
| *G06K 1/12* | (2006.01) |
| *G06Q 50/26* | (2024.01) |

(52) U.S. Cl.
CPC ......... *G06N 5/04* (2013.01); *G06K 19/06159* (2013.01); *G06N 20/00* (2019.01); *G06K 1/123* (2013.01); *G06Q 50/26* (2013.01)

(58) Field of Classification Search
CPC ........... G06N 5/04; G06N 20/00; G06N 3/04; G06N 3/08; G06K 19/06159; G06K 1/123; G06Q 50/26
See application file for complete search history.

(56) References Cited

U.S. PATENT DOCUMENTS

| | | | |
|---|---|---|---|
| 9,613,523 B2 * | 4/2017 | Davidson | ........... G05B 19/0428 |
| 2019/0304026 A1 * | 10/2019 | Lyman | .................. G06Q 40/08 |

* cited by examiner

*Primary Examiner* — Kamran Afshar
*Assistant Examiner* — Brian J Hales
(74) *Attorney, Agent, or Firm* — Davis Wright Tremaine LLP

(57) ABSTRACT

One or more aspects of the present application relate to systems and methods for collecting, processing and generating information regarding risk assessments related to fire events. More specifically, one or more aspects of the present application relate to processing of inputs to generate assessments corresponding to a characterization of risk for individual structures within a defined region. Other aspects of the present application relate to processing of inputs to generate assessments corresponding to a modeling or characterization of fire behavior risk within a defined region. Such assessments of structural risk or fire behavior risk can be utilized in accordance with fire mitigation or personnel organization response to structural risk or fire behavior risk.

23 Claims, 18 Drawing Sheets

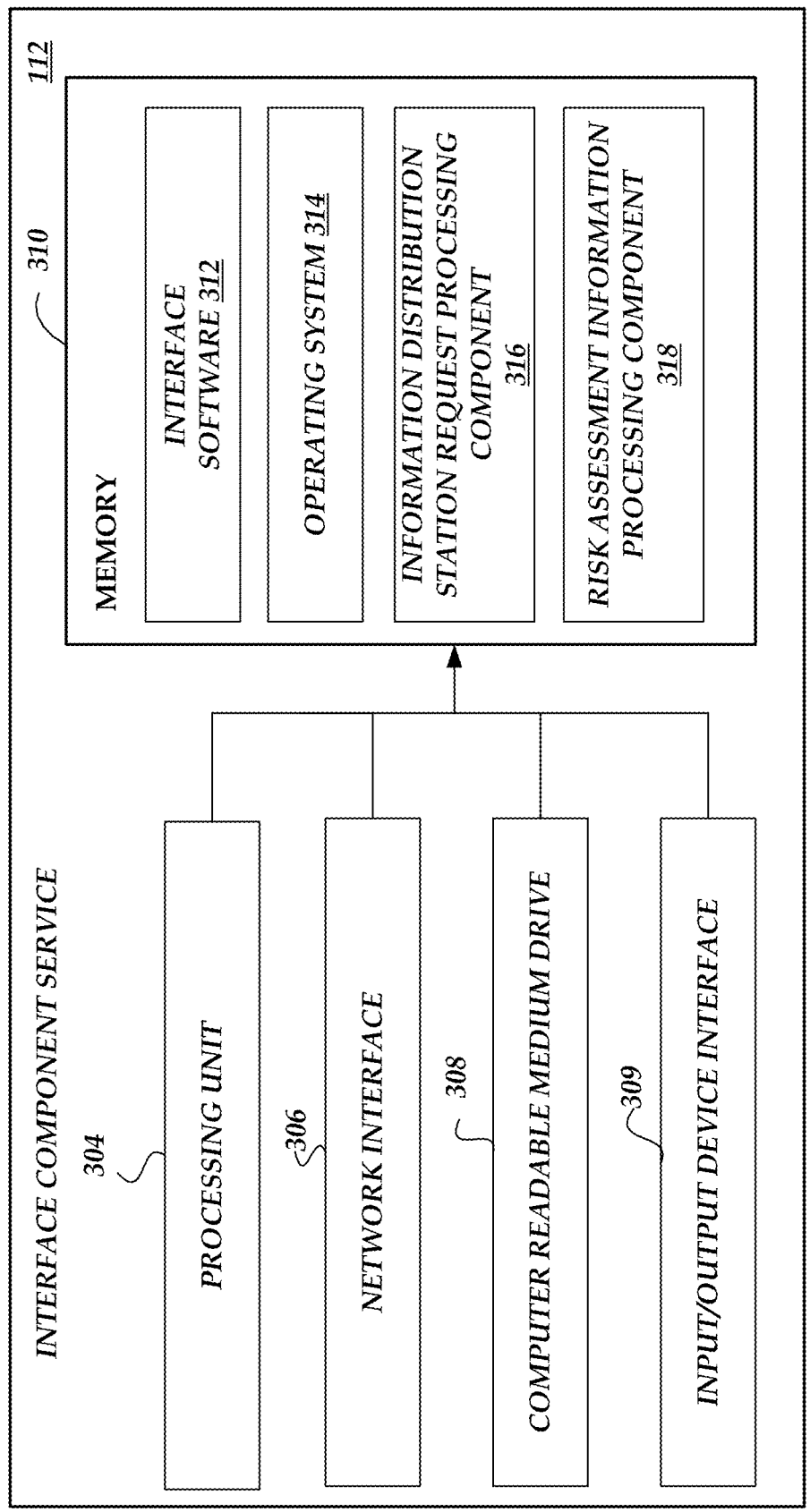

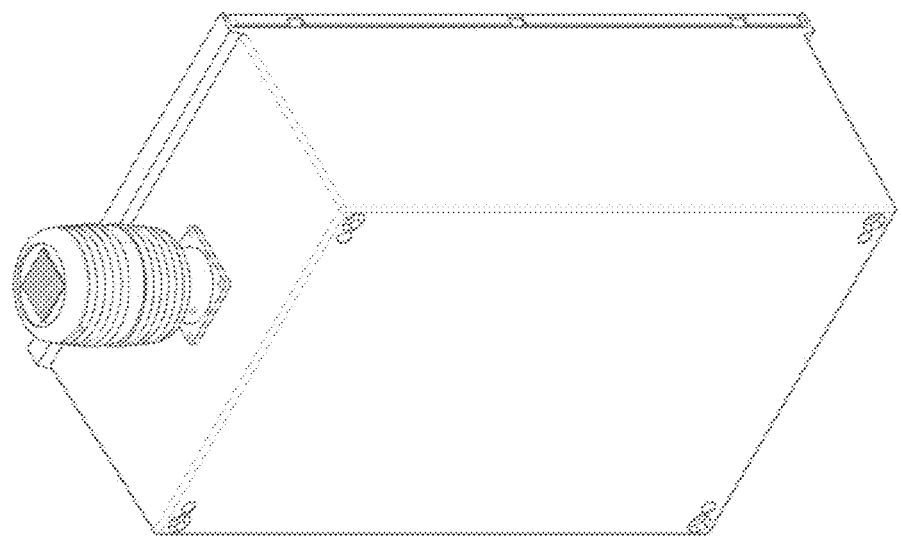

DISTRIBUTING STRUCTURE RISK ASSESSMENT USING INFORMATION DISTRIBUTION STATIONS

BACKGROUND

Generally described, computing devices and communication networks can be utilized to exchange data and/or information. In a common application, a computing device can request content from another computing device via the communication network. For example, a user at a personal computing device can utilize a browser application to request a content page (e.g., a network page, a Web page, etc.) from a server computing device via the network (e.g., the Internet). In such embodiments, the user computing device can be referred to as a client computing device and the server computing device can be referred to as a content provider. In another embodiment, the user computing device can collect or generate information and provide the collected information to a server computing device for further processing or analysis.

In the context of fire protection and fire event damage mitigation, computing systems and communication networks can be utilized to provide information to emergency services personnel. For example, computing systems can be configured to process vegetation fuel characteristics of a region and make assessments or characterizations of a likelihood of fire occurring or growing based on the assessed fuel characteristics. Such information can be made available via computing networks to coordinators or controllers to assist with the organization of emergency personnel or determining evacuations.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

FIG. 3 is a block diagram illustrative of components of an interface component service provided by a network-based service to provide portions of risk assessment information in accordance with aspects of the present application;

FIGS. 8-15 are schematics of illustrative information distribution stations in accordance with aspects of the present application.

DETAILED DESCRIPTION

Figure 1:
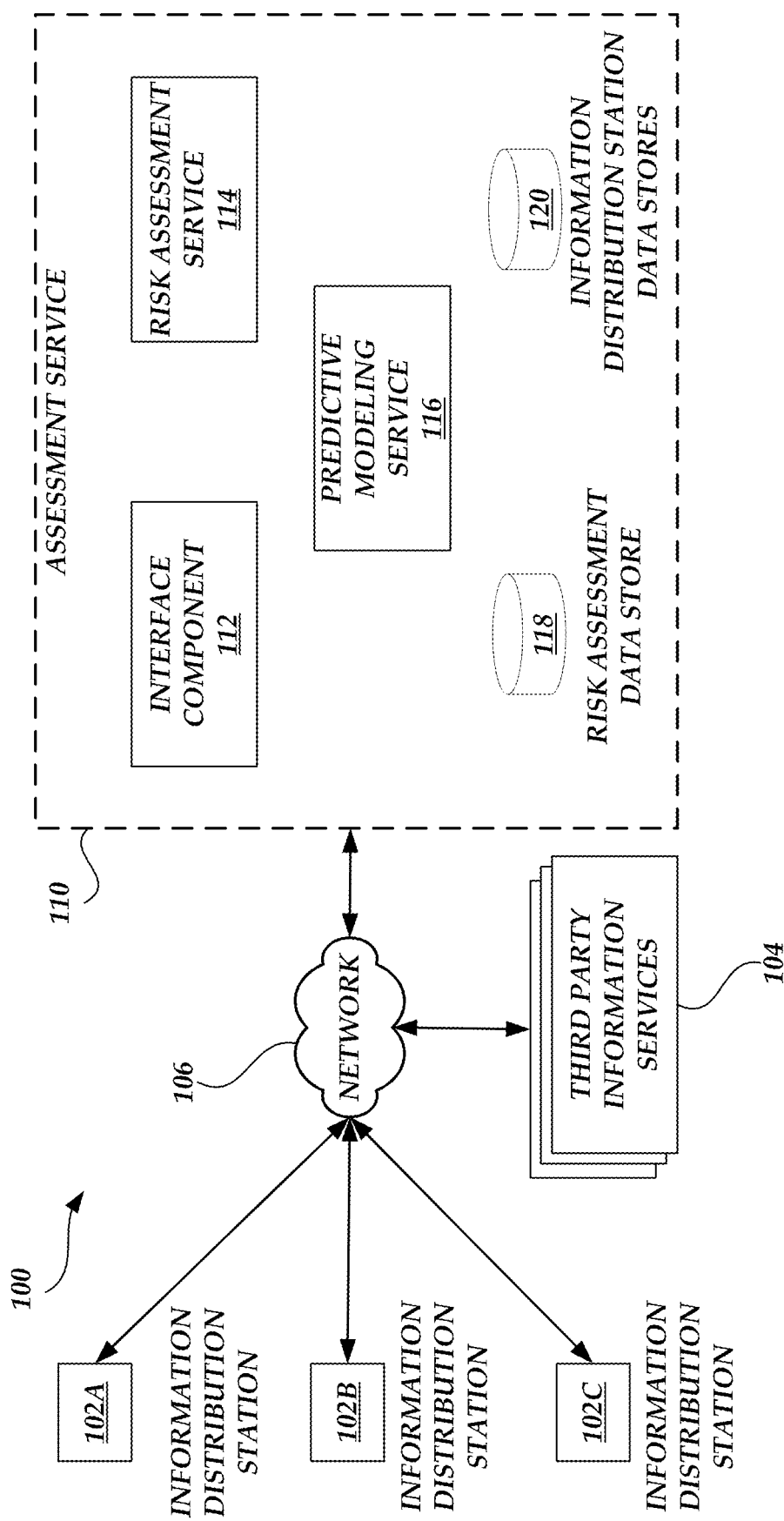
FIG. 1 depicts a schematic diagram of a network service provider having a plurality of information distribution stations in which various embodiments according to the present disclosure can be implemented.

One or more aspects of the present application relate to systems and methods for collecting, processing and generating information regarding risk assessments related to fire events. More specifically, one or more aspects of the present application relate to processing of inputs to generate assessments corresponding to a characterization of risk for individual structures within a defined region. Other aspects of the present application relate to processing of inputs to generate assessments corresponding to a modeling or characterization of fire behavior risk within a defined region. Such assessments of structural risk or fire behavior risk can be utilized in accordance with fire mitigation or personnel organization response to structural risk or fire behavior risk. Generally defined, structural risk corresponds to a characterize of the likelihood that a structure will incur damage or be a loss in the event of a fire event. Fire behavior risk includes aspects of derived outputs including not but limited to major and minor fire paths, flame lengths, fire line intensity, rate of spread, wind speed, wind azimuth direction, nodes of influence, and any unique combination or derivation of the above.

In accordance with still other aspects of the present application, a system for distribution of structural risk assessments is further provided. More specifically, individual risk information distribution station are located within a defined geographic region. Each individual risk information distribution station includes redundant risk assessment information, which is typically embodied in different forms. For example, an individual information distribution station may provide physical, printed material depicting risk assessment information for structures within the geographic region. The individual risk information distribution station can also include an electronic representation of the risk assessment information that may be accessed via computing device, such as an electronic file stored in a portable media device that can be plugged into a computing device. Still further, in a third redundant format, the risk information distribution station can include network access information, such as a Uniform Resource Locator (URL), that facilitate access to a network service to provide risk assessment information via a network connection.

Current approaches to provide risk assessment information has specific technical and organization deficiencies. In one aspect, as previously referenced, traditional risk assessment information systems are limited to characterizing risk of whether a fire is more likely or less likely. These approaches are predominantly based on utilizing vegetative fuel conditions (e.g., volume of vegetation, moisture content of vegetation, environmental humidity, etc.). The resulting outputs from such systems are typically limited to binary determinations. Accordingly, such approaches do not generally provide information to emergency personnel to assist with identifying structures that may be more of risk for damage within a defined region. Such approaches also do not facilitate assessment fire behavior or fire behavior risk at different organizational levels, such as block level, community level, city level, state level, etc.

In addition to the limitations of the data processing approach, traditional distribution methodologies are limited in providing information to possible consumers, such as emergency personnel. For example, a strictly network distribution mechanism may suffer from power and communication network failure associated with fire events. Additionally, for larger fire events, emergency personnel from many different may be brought in to assist. In these cases, the emergency personnel may be unfamiliar with regional information and may have a wide range of devices to access information, including computing devices that may have different communication capabilities, viewing capabilities and interfaces.

To address at least some portion of the above-described deficiencies, the present application includes multiple aspects related to the generation of risk assessment information corresponding to defined geographic areas. Illustratively, risk assessment information can include at least one of an assessment of structural risk, an assessment of fire behavior risk, or a combination thereof. Such risk assessment information is illustratively implemented in accordance with machine learned algorithms that have been trained based on historical regional data. In certain embodiments, vegetative fuel characteristics do not form inputs to the machine learned algorithms and are not considered a sufficiently significant variable in the assessment of relative structural risk or fire behavior risk based on fire events. Additionally, in other embodiments, the generated risk assessment information is distributed based on information distribution stations that include redundant forms of the risk assessment information. Such redundant forms facilitate access by emergency personnel based on the familiarity with regional structures; availability of communication networks; availability of computing devices; available time to access risk assessment information and the like.

Although aspects of the present application will be described with regard to illustrative examples, computing device, machine learning algorithms and the like, one skilled in the relevant art will appreciate that the disclosed embodiments are illustrative in nature and should not be construed as limiting.

FIG. 1 is a block diagram of an environment 100 that includes one or more individual information distribution stations 102 accessible by one or more individuals (not illustrated), one or more devices associated with third-party information providers 104, and an assessment service 110 according to one embodiment. The environment 100 includes a plurality of information distribution stations 102 utilized by individuals that either are specifically configured to provide risk assessment information provided by by the assessment service 110 or that relate to collected information that is processed by the assessment service 110. By way of illustration, individual information distribution stations are physically placed within a defined region to provide emergency responders with access to the risk assessment information. For example, individual information distribution stations 102 may be located at ingress or egress points in a neighborhood so that the information is accessible by emergency personnel as they approach a new geographic area. The information distribution stations 102 may unique to a defined geographic area such that there is only a single inf individual information distribution station within a defined area. In such embodiments, the risk assessment information included in each individual information distribution station 102 would be unique to the geographic area. Alternatively, the environment 100 may also include embodiments in which a plurality of information distribution stations 102 may be strategically located within a common geographic region and would include similar risk assessment information. Illustrative components of an information distribution station 102 will be described in FIG. 2B.

Illustratively, individual accessing computing devices may be utilized to access at least some portion of the risk assessment information provided by via an information distribution station 102. Such computing devices can illustratively correspond to a laptop or tablet computer, personal computer, wearable computer, server, personal digital assistant (PDA), hybrid PDA/mobile phone, mobile phone, electronic book reader, set-top box, camera, appliance (e.g. a thermostat or refrigerator), controller, digital media player, watch, glasses, a home or car device, Internet of Thing ("IoT") devices, virtual reality or augmented reality devices, wearable accessories, and the like. Still further, the individual computing devices can represent devices or components that have alternative purposes, but have been configured to function as an individual device as described herein. For example, the individual device can correspond to a security device, emergency responder equipment, or commerce device that is configured to provide access to the assessment information. Illustrative components of a computing device will be described with regard to FIG. 2A.

The environment 100 includes a plurality of devices 104 or network of devices utilized by third party information providers, generally referred to as third party information services 104 to submit information. Third-party information sources 104 may include any number of different computing devices capable of communicating with the network 106, via a direct connection or via an intermediary. As will be explained in greater detail below, the applications can be configured to provide information related to an individual, such as social media usage, network interaction, and the like. For example, the third-party information sources 104 can provide individual information related to information reported by individual emergency personnel. In another example, the third-party information sources 104 can include environmental information that can be used as inputs in the generation of the risk assessment information or that can be included in risk assessment information when accessed by an individual via an information distribution station 102. In still another example, the third-party information sources 104 can include medical services that can include medical history information or recommendations/suggestions regarding corrective actions. Other examples of third-party information sources 104 are considered to be within the scope of the present application.

Network 106 may be any wired network, wireless network, or combination thereof. In addition, the network 106 may be a personal area network, local area network, wide area network, cable network, fiber network, satellite network, cellular telephone network, data network, or combination thereof. In the example environment of FIG. 1, network 106 is a global area network (GAN), such as the Internet. Protocols and components for communicating via the other aforementioned types of communication networks are well known to those skilled in the art of computer communications and thus, need not be described in more detail herein. While each of the information distribution stations 102, the third-party information sources 104, and the assessment service 110 are depicted as having a single connection to the network 106, individual components of the information distribution stations 102, the third-party information sources 104, and the assessment service 110 may be connected to the network 106 at disparate points. Accordingly, communication times and capabilities may vary between the components of FIG. 1. Likewise, although FIG. 1 is illustrated as having a single network 106, one skilled in the relevant art will appreciate that the environment 100 may utilize any number or combination of networks.

In accordance with embodiments, the assessment service 110 includes one or more servers for processing the content to conduct one or more risk assessments and provide the risk assessment information via individual information distribution stations 102 as described herein. As described in further detail below, the assessment service 110 includes an interface component 112 that can be configured to receive request from computing devices accessing a format of the risk assessment information from an individual information distribution station 102. The interface component 112 may also access or provide access to one or more third party information sources 104.

The assessment service 110 further includes a risk assessment service 114 configured to provide risk assessments based on a machine learned algorithm as described herein. Still further, in some embodiments, the assessment service 110 includes a predictive modeling service 116 configured to generate machine learned algorithms corresponding to risk assessment training sets. Although the various services 112-116 associated with the assessment service 110 are illustrated as single components, each individual service 112, 114, 116 may be implemented in a number of different instantiated components, including virtualized resources. The assessment service 110 further can include a number of data stores for maintaining different information. The data stores include assessment data store 118 for maintaining the risk assessment information algorithms and training information utilized to generate risk assessment information for different geographic areas. The data stores can also include an information distribution station data store 120 for maintaining the risk assessment information that can be provided in response to requests from individual computing devices accessing a network access information provided in an information distribution station 102. Although illustrated as individual data stores, the data stores 118 and 120 can correspond to multiple data stores, distributed data stores, or variations thereof.

It will be appreciated by those skilled in the art that the environment 100 may have fewer or greater components than are illustrated in FIG. 1. Thus, the depiction of the environment 100 in FIG. 1 should be taken as illustrative. For example, in some embodiments, components of the assessment service 110 may be executed by one more virtual machines implemented in a hosted computing environment or otherwise provided in a non-physical manner A hosted computing environment may include one or more rapidly provisioned and released computing resources, which computing resources may include computing, networking or storage devices.

Additionally, while such components are illustrated as logically being logically grouped in FIG. 1, one skilled in the relevant art will appreciate that one or more aspects of the present application can include the assessment service 110 as being implemented in multiple geographic areas. Additionally, not all geographic areas hosting portions of the assessment service 110 will necessarily have all the same components or combination of components.

Figure 2A:
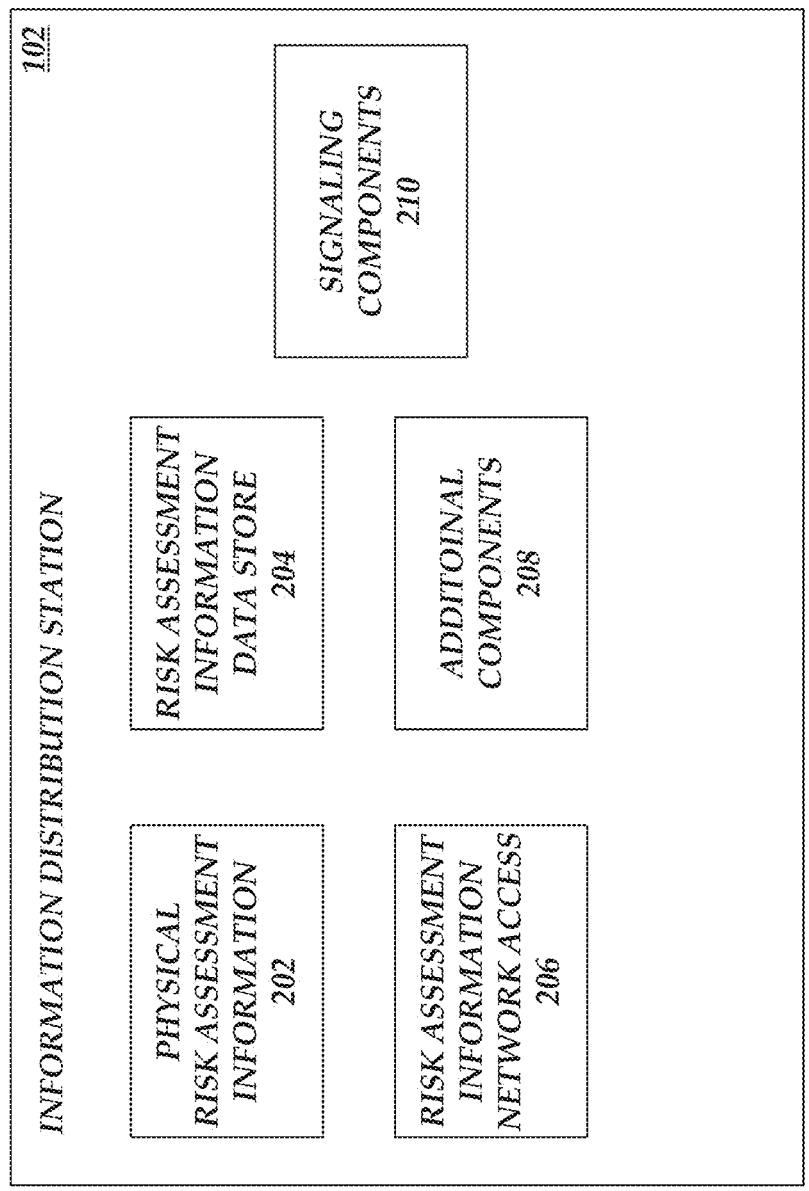
FIG. 2A is a block diagram illustrative of components of an information distribution station having redundant formats of risk assessment information in accordance with embodiments of the present application.

FIG. 2A is a block diagram illustrative of components of an information distribution station 102 having redundant formats of risk assessment information in accordance with embodiments of the present application. As previously described, in embodiments, individual risk information distribution stations 102 includes redundant risk assessment information, which is typically embodied in different forms. In one aspect, an individual information distribution station 102 may provide physical, printed material 202 depicting risk assessment information for structures within the geographic region. The physical printed material 202 is accessible to individuals that access the information distribution station 202 and include multiple copies that can distributed to a set of individuals or allow for maintenance of the physical printed material 202 in the event of damage while being used.

The individual risk information distribution station can also include an electronic representation of the risk assessment information that may be accessed via computing device, such as an electronic file stored in a portable media device 204 that can be plugged into a computing device. In this aspect, the risk assessment information is transmitted directly to the data store 204 via the communication network 106 or via a computing device utilized to store the information. In this aspect, the data store 204 is configured to be accessible directly via the interfaces of a computing device utilized by emergency personnel, such as physical ports or short range wireless. Illustratively, access to the risk assessment information in the data store 204 does not require network access, and may be utilized in scenarios in which communication network access is reduced or unavailable or in which a computing device does not include necessary communication network access components.

Still further, in a third redundant format, the risk information distribution station can include network access information 206, such as a Uniform Resource Locator (URL), that facilitate access to a network service to provide risk assessment information via a network connection. In this embodiment, the network access information 206 does not necessarily include all the risk assessment information, but provides network access information, information distribution station 102 identifiers, and other security or access information that allows a computing device to access the assessment service 110. The network access information 206 may illustratively be in the form of a three-dimensional barcode that can be accessed directly from cameras or other vision systems on the computing devices to obtain the network access information. In some embodiments, the information distribution station 102 can also include commands that cause the computing device accessing the network access information to provide information to the access service 110, such as location information, environmental information (temperature, humidity, windspeed, etc.), individual identification information, and the like.

Illustratively, the information distribution stations 102 can further include any number of additional components 208 that can be utilized by emergency personnel. Such additional components including, but are not limited to, first aid items, tools (e.g., locks, screw drivers, hammers, etc.), consumable items (e.g., food or water), emergency equipment (e.g., communication devices, protective gear, etc.), supplemental or additional information (e.g., location of fire infrastructure equipment, location, etc.) and the like. FIGS. 8-15 are schematics of illustrative information distribution stations 102 in accordance with aspects of the present application. As also depicted in FIGS. 8-15, an outer surface of the information distribution stations 102 can include signaling components 210 that provides visual cues to individuals regarding the location of the information distribution stations 102 with a geographic area, such as a flashing light. In some embodiment, the information distribution stations 102 can further include additional control mechanisms within the signaling components 210 that allow the information distribution stations 102 to utilize the external signaling information to provide additional information. For example, a rate of flashing or pattern of flashing can provide information to emergency personnel, such as proximity of a fire event or notifications of other personnel that have accessed the information distribution stations 102. The signal components 102 can be configured to receive control information from the assessment service 110 or additional third party sources 104.

Although the information distribution stations 102 are illustratively embodied as physical items, in alternative embodiments, at least some portion of the information distribution stations may be embodied in a non-physical or virtual format. In accordance with these embodiments, virtual implementations would be organized to be accessed electronically in accordance with physical locations without the full set of components illustrated in FIG. 2A.

Figure 2B:
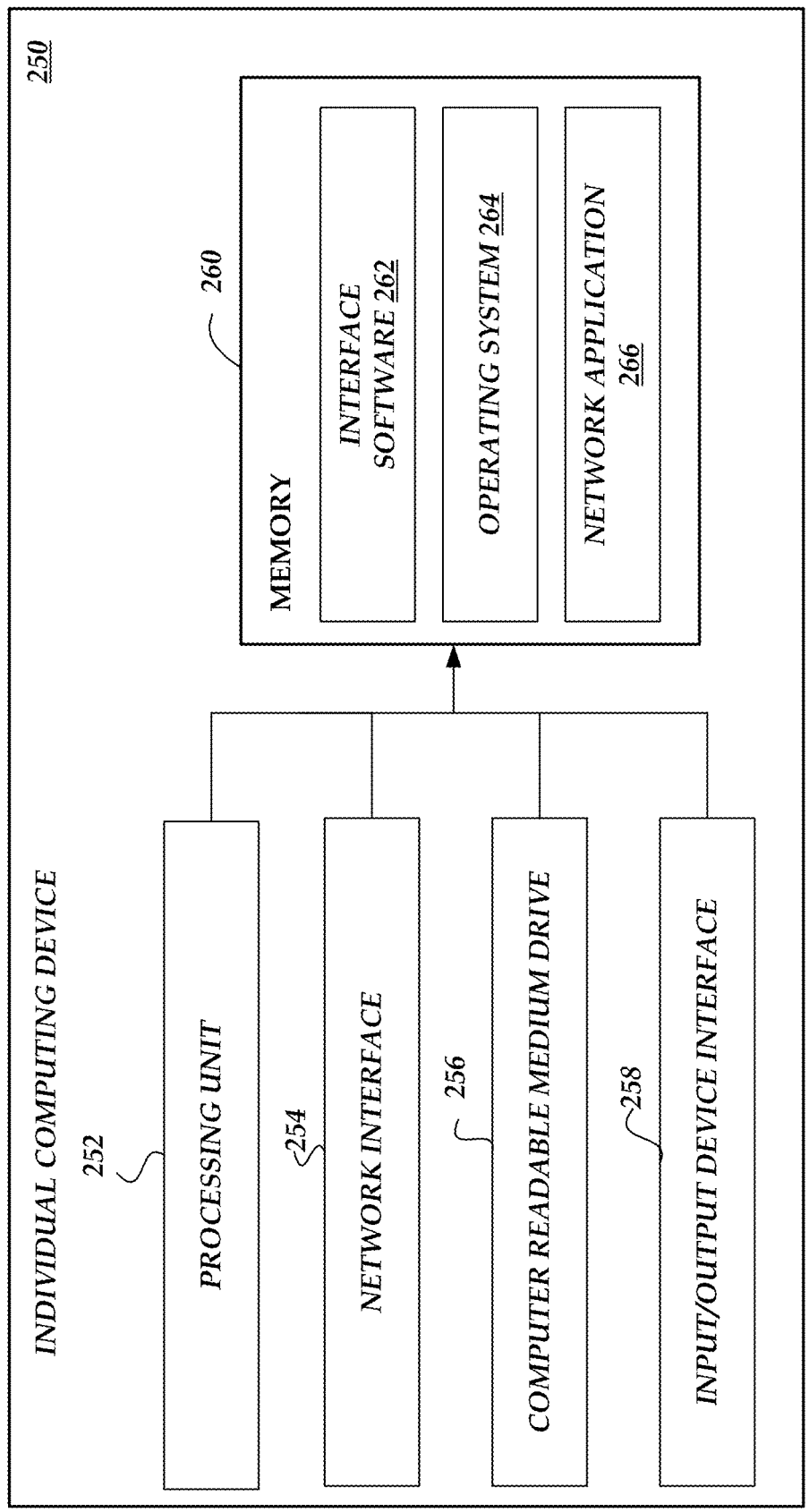
FIG. 2B is a block diagram illustrative of components of a computing device that may be utilized to access portions of the risk assessment information from an information distribution station in accordance with aspects of the present application.

FIG. 2B depicts one embodiment of an architecture of an illustrative individual computing device 102, such as a personal computer, tablet computer, smartphone, or other device, that can generate content and process content requests in accordance with the present application. FIG. 2A is illustrative of the general framework of an individual computing device that can be utilized to access risk assessment information from an information distribution station 102. The general architecture of the computing device depicted in FIG. 2A includes an arrangement of computer hardware and software components that may be used to implement aspects of the present disclosure. As illustrated, the computing device includes a processing unit 252, a network interface 254, a computer readable medium drive 256, an input/output device interface 258, an optional display, and an input device, all of which may communicate with one another by way of a communication bus. In various embodiments, components such as the display and/or the input device may be integrated into the computing device, or they may be external components that are coupled to the computing device.

The network interface 258 may provide connectivity to one or more networks or computing systems, such as the network 106 of FIG. 1. The processing unit 252 may thus receive information and instructions from other computing systems or services via a network. The processing unit 252 may also communicate to and from memory 260 and further provide output information for an optional display via the input/output device interface. The input/output device interface 258 may also accept input from the optional input device, such as a keyboard, mouse, digital pen, etc. In some embodiments, the computing device may include more (or fewer) components than those shown in FIG. 2B.

The memory 260 may include computer program instructions that the processing unit 252 executes in order to implement one or more embodiments. The memory 260 generally includes RAM, ROM, or other persistent or non-transitory memory. The memory 260 may store an operating system 264 that provides computer program instructions for use by the processing unit 252 in the general administration and operation of the computing device. The memory 260 may further include computer program instructions and other information for implementing aspects of the present disclosure. For example, in one embodiment, the memory 260 includes a network application 266, such as browser application or other customized application, for accessing and generating individual information.

FIG. 3 depicts one embodiment of an architecture of an illustrative server for implementing the interface component service 112 as described. The general architecture of the interface component service 112 depicted in FIG. 3 includes an arrangement of computer hardware and software components that may be used to implement aspects of the present disclosure. As illustrated, the interface component service 112 includes a processing unit 304, a network interface 306, a computer readable medium drive 308, and an input/output device interface 309, all of which may communicate with one another by way of a communication bus. The components of the interface component service 112 may be physical hardware components or implemented in a virtualized environment.

The network interface 309 may provide connectivity to one or more networks or computing systems, such as the network 106 of FIG. 1. The processing unit 304 may thus receive information and instructions from other computing systems or services via a network. The processing unit 304 may also communicate to and from memory 310 and further provide output information for an optional display via the input/output device interface 306. In some embodiments, the interface component service 112 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 306 in the general administration and operation of the interface component service 112. The memory 310 may further include computer program instructions and other information for implementing aspects of the present disclosure. For example, in one embodiment, the memory 310 includes an information distribution station request processing component 316 that is configured to receive requests for risk assessment information from computing devices accessing network access information provided by an information distribution station 102. The memory 310 includes a risk assessment information processing component 318 for processing requests for risk assessment information.

Figure 4:
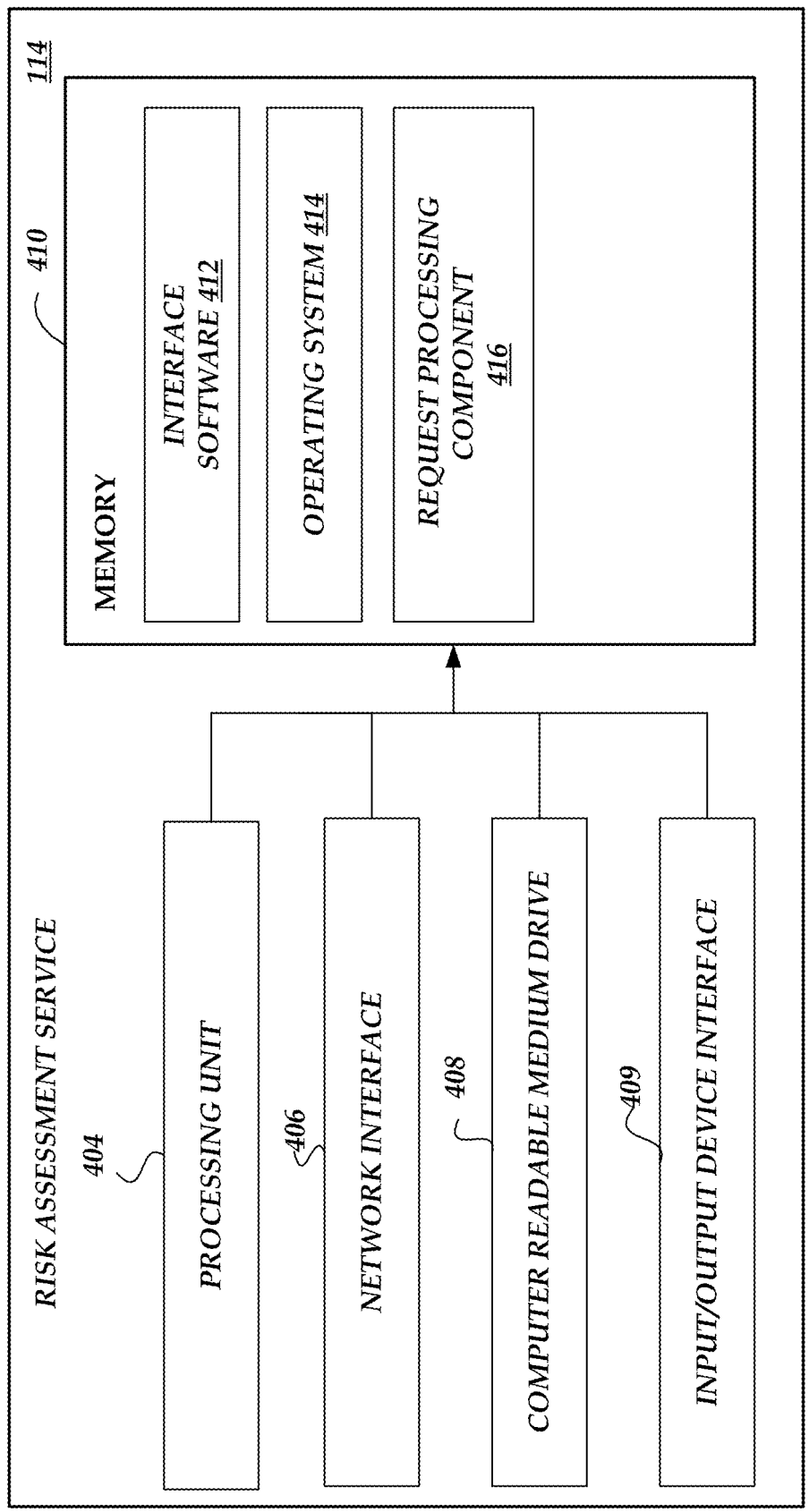
FIG. 4 is a block diagram illustrative of components of a risk assessment service provided by a network-based service to provide portions of risk assessment information in accordance with aspects of the present application.

FIG. 4 depicts one embodiment of an architecture of an illustrative server for implementing the risk assessment service 114 as described. The general architecture of the risk assessment service 114 depicted in FIG. 4 includes an arrangement of computer hardware and software components that may be used to implement aspects of the present disclosure. As illustrated, the risk assessment service 114 includes a processing unit 404, a network interface 406, a computer readable medium drive 408, and an input/output device interface 409, all of which may communicate with one another by way of a communication bus. The components of the risk assessment service 114 may be physical hardware components or implemented in a virtualized environment.

The network interface 409 may provide connectivity to one or more networks or computing systems, such as the network 106 of FIG. 1. The processing unit 404 may thus receive information and instructions from other computing systems or services via a network. The processing unit 404 may also communicate to and from memory 410 and further provide output information for an optional display via the input/output device interface 406. In some embodiments, the risk assessment service 114 may include more (or fewer) components than those shown in FIG. 4.

The memory 410 may include computer program instructions that the processing unit 404 executes in order to implement one or more embodiments. The memory 410 generally includes RAM, ROM, or other persistent or non-transitory memory. The memory 410 may store an operating system 414 that provides computer program instructions for use by the processing unit 406 in the general administration and operation of the interface component service 112. The memory 410 may further include computer program instructions and other information for implementing aspects of the present disclosure. For example, in one embodiment, the memory 410 includes a request processing component 416 that is configured to evaluate machine learned algorithms to generate risk assessment information for individual geographic regions associated with one or more information distribution stations 102.

Figure 5:
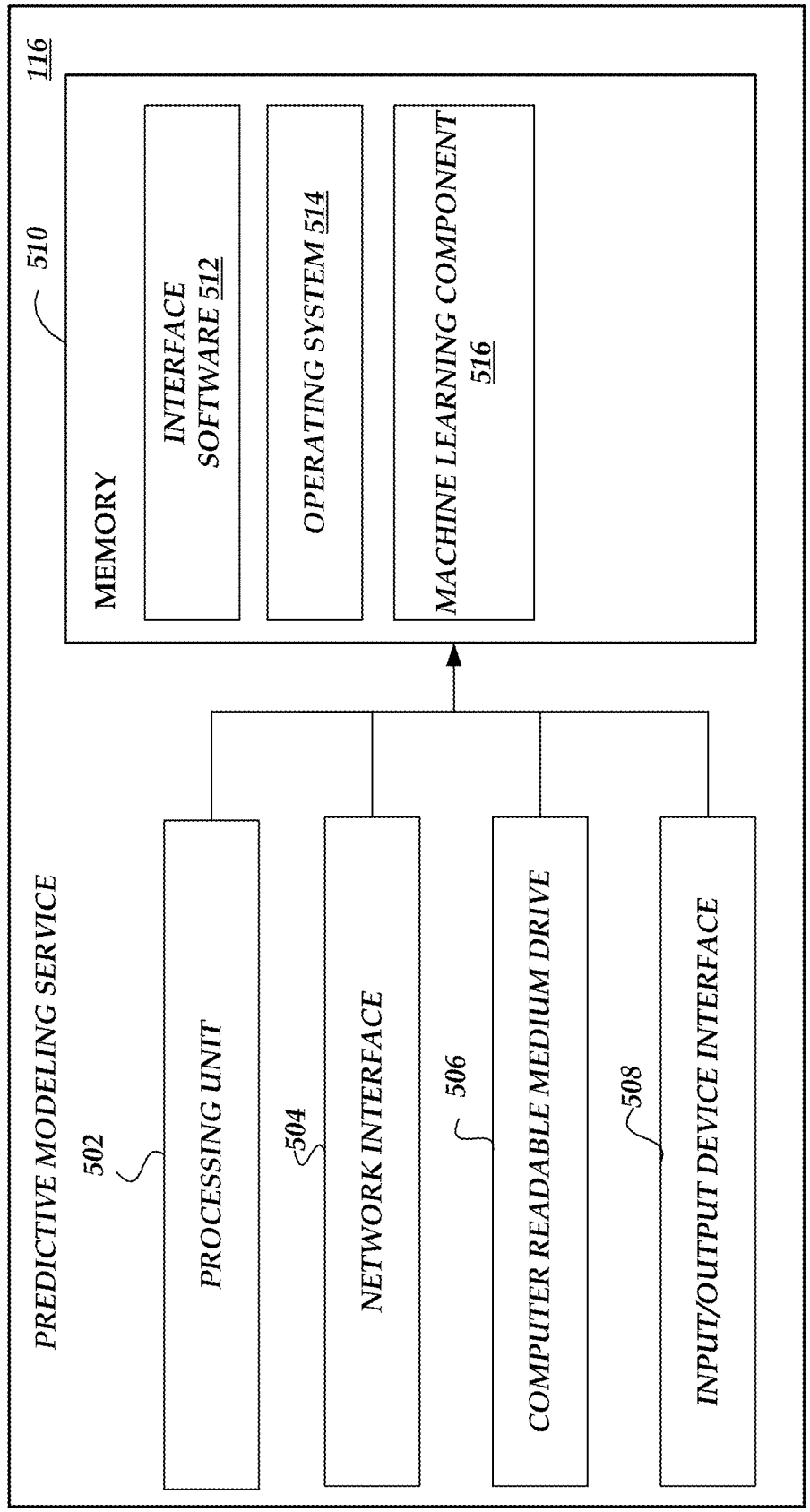
FIG. 5 is a block diagram illustrative of components of a predictive modeling service provided by a network-based service to provide portions of risk assessment information in accordance with aspects of the present application.

FIG. 5 depicts one embodiment of an architecture of an illustrative server for implementing the predictive modeling service 116 as described. The general architecture of the predictive modeling service 116 depicted in FIG. 5 includes an arrangement of computer hardware and software components that may be used to implement aspects of the present disclosure. As illustrated, the predictive modeling service 116 includes a processing unit 502, a network interface 504, a computer readable medium drive 506, and an input/output device interface 508, all of which may communicate with one another by way of a communication bus. The components of the predictive modeling service 116 may be physical hardware components or implemented in a virtualized environment.

The network interface 508 may provide connectivity to one or more networks or computing systems, such as the network 106 of FIG. 1. The processing unit 504 may thus receive information and instructions from other computing systems or services via a network. The processing unit 504 may also communicate to and from memory 510 and further provide output information for an optional display via the input/output device interface 506. In some embodiments, the predictive modeling service 116 may include more (or fewer) components than those shown in FIG. 5.

The memory 510 may include computer program instructions that the processing unit 504 executes in order to implement one or more embodiments. The memory 510 generally includes RAM, ROM, or other persistent or non-transitory memory. The memory 510 may store an operating system 514 that provides computer program instructions for use by the processing unit 506 in the general administration and operation of the predictive modeling service 116. The memory 510 may further include computer program instructions and other information for implementing aspects of the present disclosure. For example, in one embodiment, the memory 510 includes a machine learning component 516 that is configured to generate machine learned algorithms that can be evaluated by the risk assessment service 114 to generate risk assessment information. In a supervised training environment, the predictive modeling service 116 trains the machine learning algorithm to form a machine learned algorithm based on training sets that correspond to processing inputs and generating outputs associated with risk assessments. However, by way of non-limiting examples, the machine learning algorithms can incorporate different learning models, including, but not limited to, a supervised learning model, an unsupervised learning model, a reinforcement learning model or a featured learning model. Depending on the type of learning model adopted by the machine learning algorithm, the configuration for processing with the collected individual information can vary (e.g., using a training set for a supervised or semi-supervised learning model). In other embodiments, the machine learning algorithm can implement a reinforcement-based learning model that implements a penalty/reward model implemented by the predictive modeling service 116.

In one embodiment, using environmental conditions that are kept constant, such as weather and fuel moisture, the machine learning algorithm simulates potential fire behavior (conditional burn probabilities) for each pixel within the spatial domain independently. The fire behavior output variables include surface fire spread, flame length, crown fire activity type, crown fire initiation, and crown fire spread. Using the characteristics such as terrain slope, shading, elevation, aspect, and weather, the machine learning algorithm estimates the dead fuel moisture and conditioning of dead fuels at the pixel level. The machine learning algorithm illustratively includes models for the following: surface fire spread, crown fire initiation and spread, spotting, dead fuel moisture, post-frontal combustion, minimum travel time, treatment optimization, and conditional burn probability.

Figure 7:
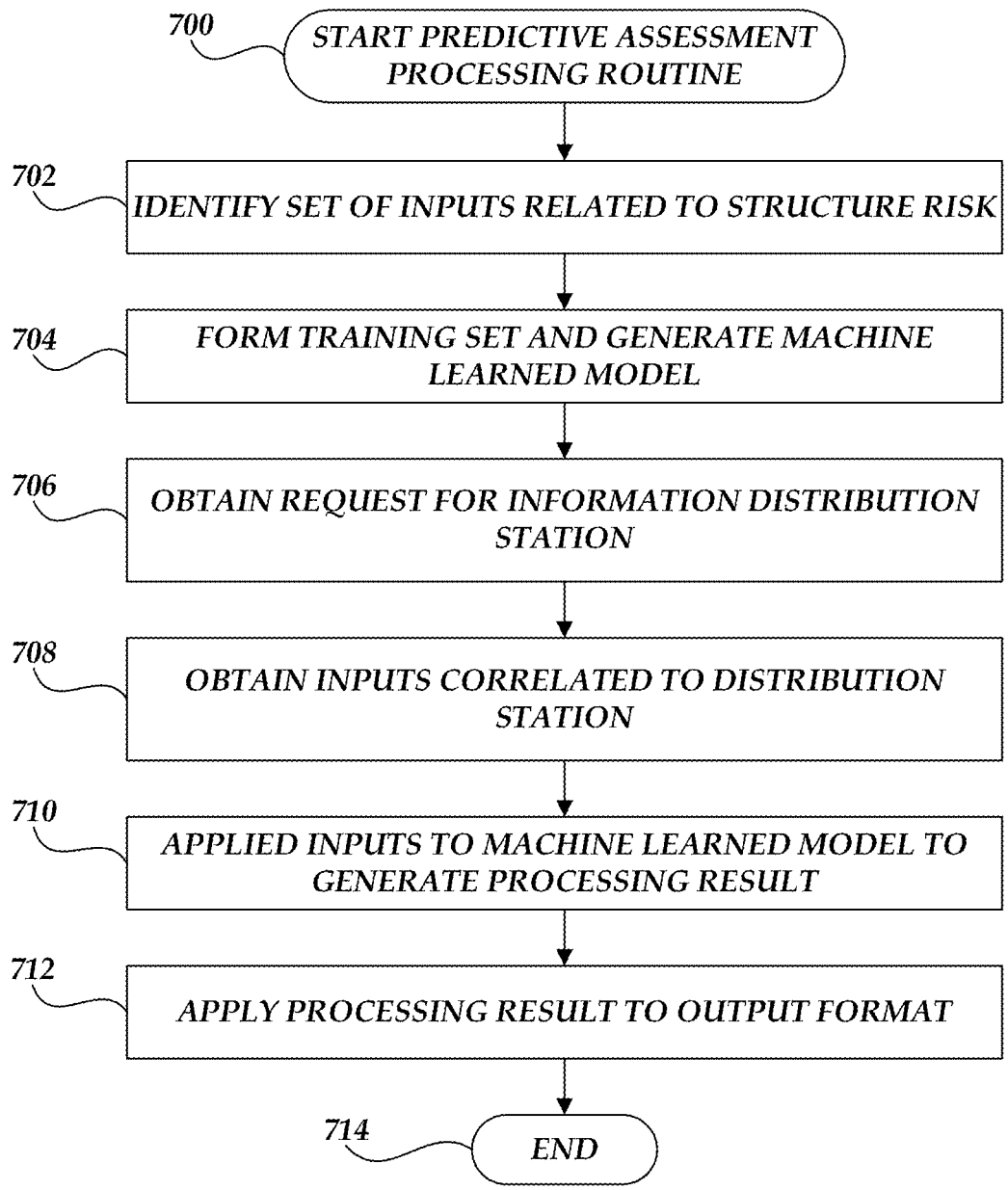
FIG. 7 is a flow diagram illustrative of a predictive assessment routine implemented by a network service in accordance with illustrative aspects of the present disclosure.
Figure 8:
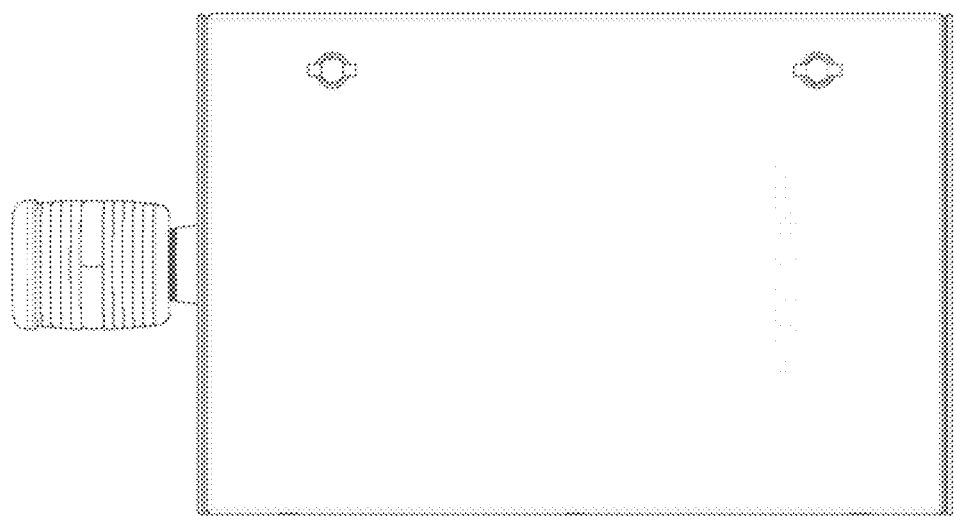
Figure 9:
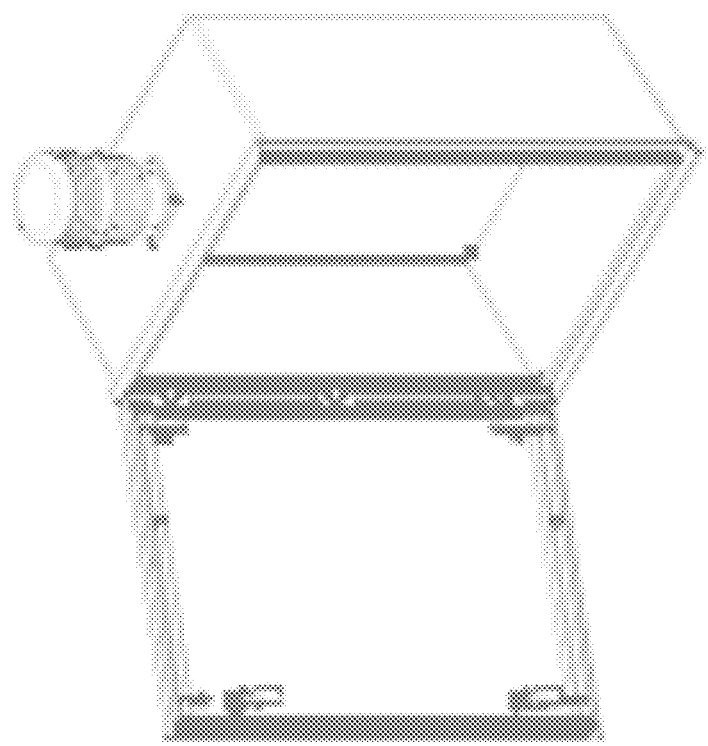
Figure 10:
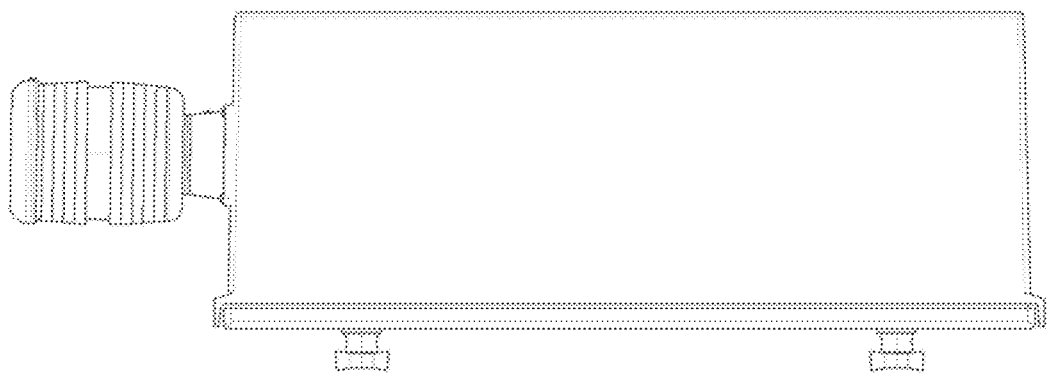
Figure 11:
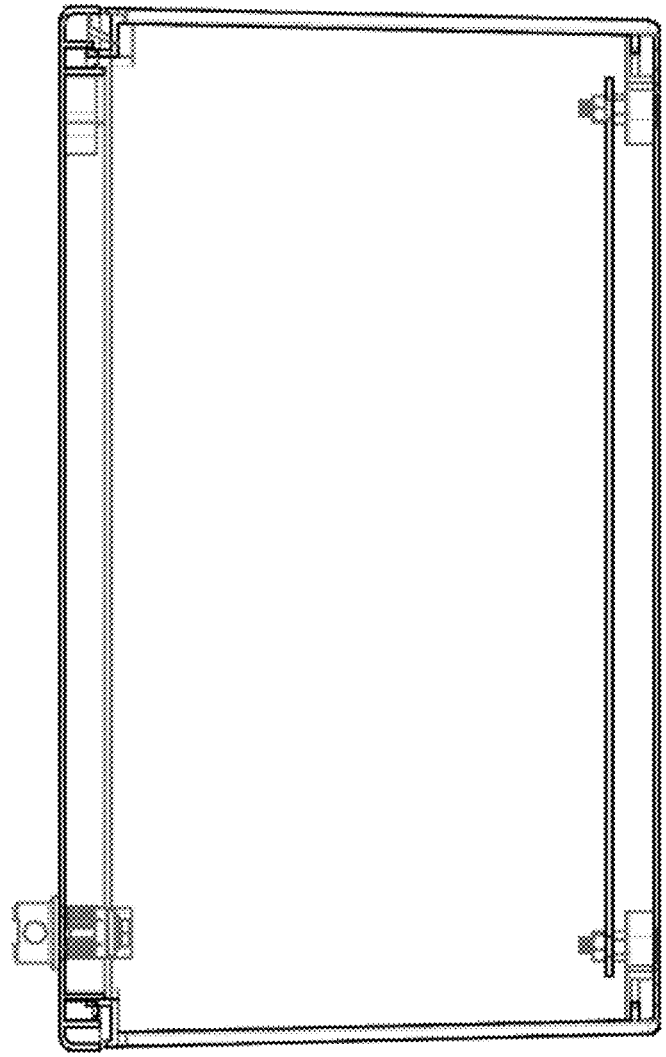
Figure 12:
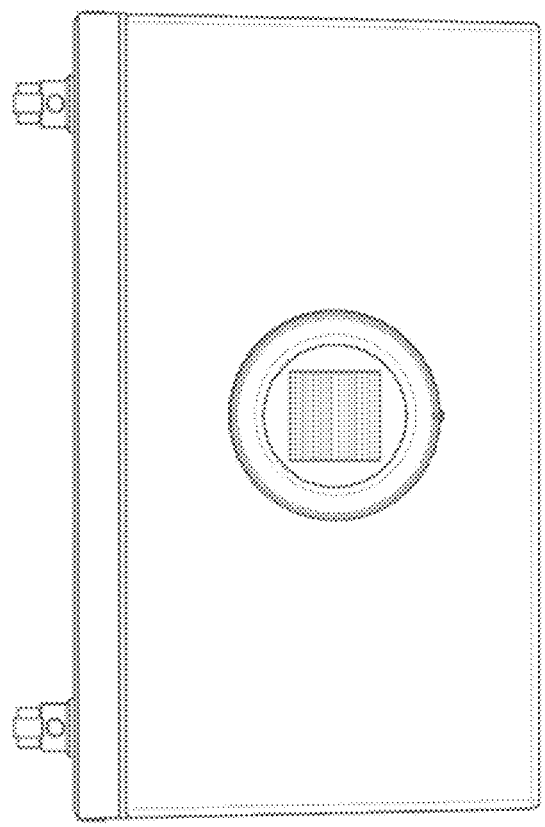
Figure 13:
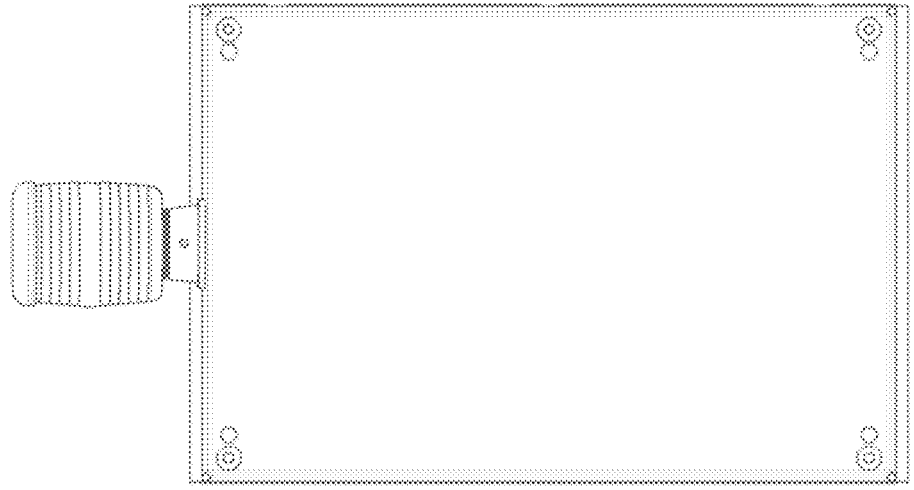
Figure 14:
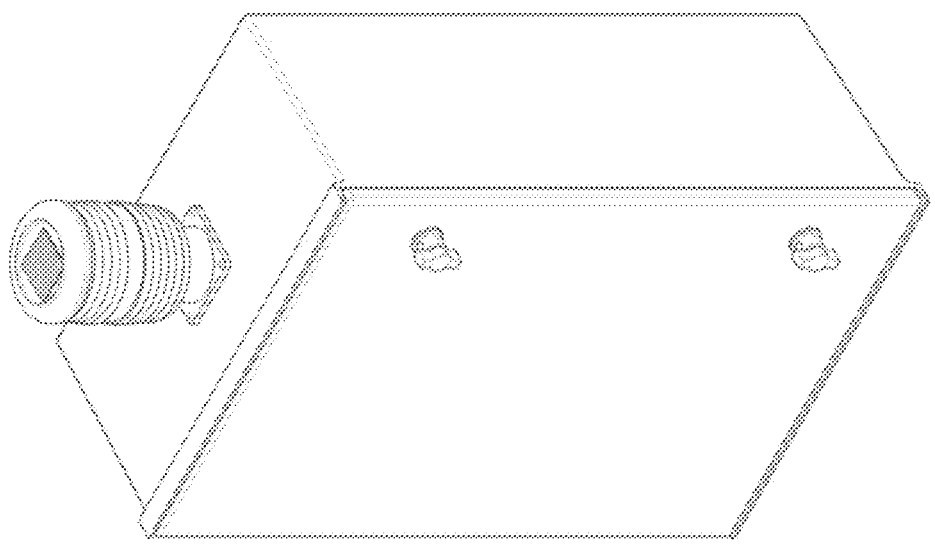

Turning now to FIG. 7, a routine 700 for facilitating predicative assessments will be described. Routine 700 is illustratively implemented by the assessment service 110 or an individual computing device implementing an assessment component. Routine 700 can be characterized in some embodiments into two portions, the generation of the machine learned models that are utilized to generate risk assessment information and the provisioning of generated risk assessment information to individual information distribution stations 102.

At block 702, the assessment service 110 collects information associated to a set of inputs related to structural risk or fire behavior risk within a defined geographic region. Illustratively, a multitude of potential inputs that could be included in such set of inputs can be characterized into variable types, such as vegetation fuel characteristics, neighborhood characteristics, and level of fire protection services. As previously described, in contrast to traditional modeling of fire event risk, aspects of the present application attempt to model structural risk assessment from a binary categorization (risk or no risk) to a continuous variable output that be utilized to prioritize mitigation techniques or resource allocation within the geographic in the event a fire event occurs. Illustratively, the individual computing devices and third-party information sources 104 can interact with the assessment service 110 to provide information in a variety of ways. For example, the individual computing devices and third-party information sources 104 can transmit information via an application programming interface ("API").

At block 704, the assessment service 110 can process the collected information to form training sets and general machine learned models. For example, in a machine-learning environment the assessment service 110 can process the information to form labels and data in a manner executable by the machine-learned algorithm. In other example, the assessment service 110 may conduct additional processing to the collected inputs to generate additional scores or metrics, such as applying normalizing, extrapolating, translating or error correcting techniques. With regard to the previous example regarding types of inputs, structural information regarding historical fire event damage information may be utilized. This historical information can include information regarding individual structures within a geographic region that were impacted by the fire events resulting in damage, destruction or unaffected structures. In another aspect, the definition of geographic area, such as neighborhood, can be processed. In this aspect, risk assessment information can look to dependency relationships between structures, vegetation, or other physical items related to structural risk. For example, structures that cannot be characterized as having a dependency relationship or a dependency relationship below a threshold can be characterized as corresponding to different geographic regions and labeled as such for the training set. As previously discussed, in one embodiment, the training set can exclude vegetative fuel levels as not being indicative of structural risk.

In accordance with aspects of the present application, the assessment service 110 can generate the various formats of the risk assessment information and provide it to the individual information distribution stations 102. This includes printed information 202, data stores with risk assessment 204 and the network access information 206. For embodiments, in which a computing device accesses network access information, at block 706, the assessment service 110 obtains requests for information related to information distribution stations 102. As described above, the requests for the information can include identifiers for the information distribution station 102, computing devices, individual identifiers, and other information. In other embodiments, the assessment service can request additional information subsequent to the original request or via third party information sources 104.

At block 708, the assessment service 110 obtains inputs associated with the specific requests that can be utilized as inputs to the machine learned algorithm. Such inputs can correspond to the geographic information, specific environmental information, and the like. At block 710, the assessment service applies the inputs against the machine learned algorithm to generate a processing result.

Figure 6A:
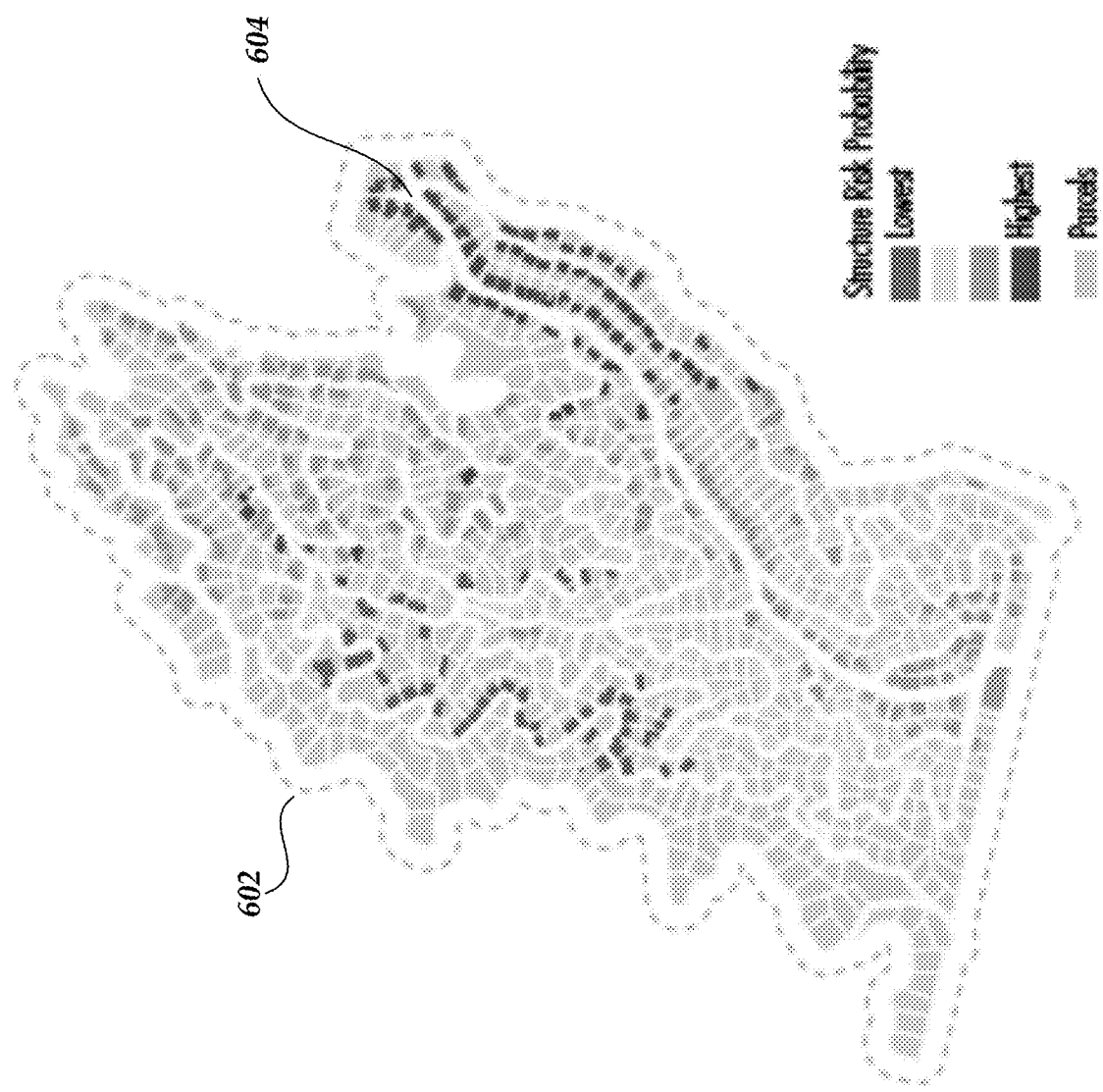
FIGS. 6A-6C depict exemplary client interfaces providing risk assessment information accessed in accordance with information distribution stations in accordance with aspects of the present application.
Figure 6B:
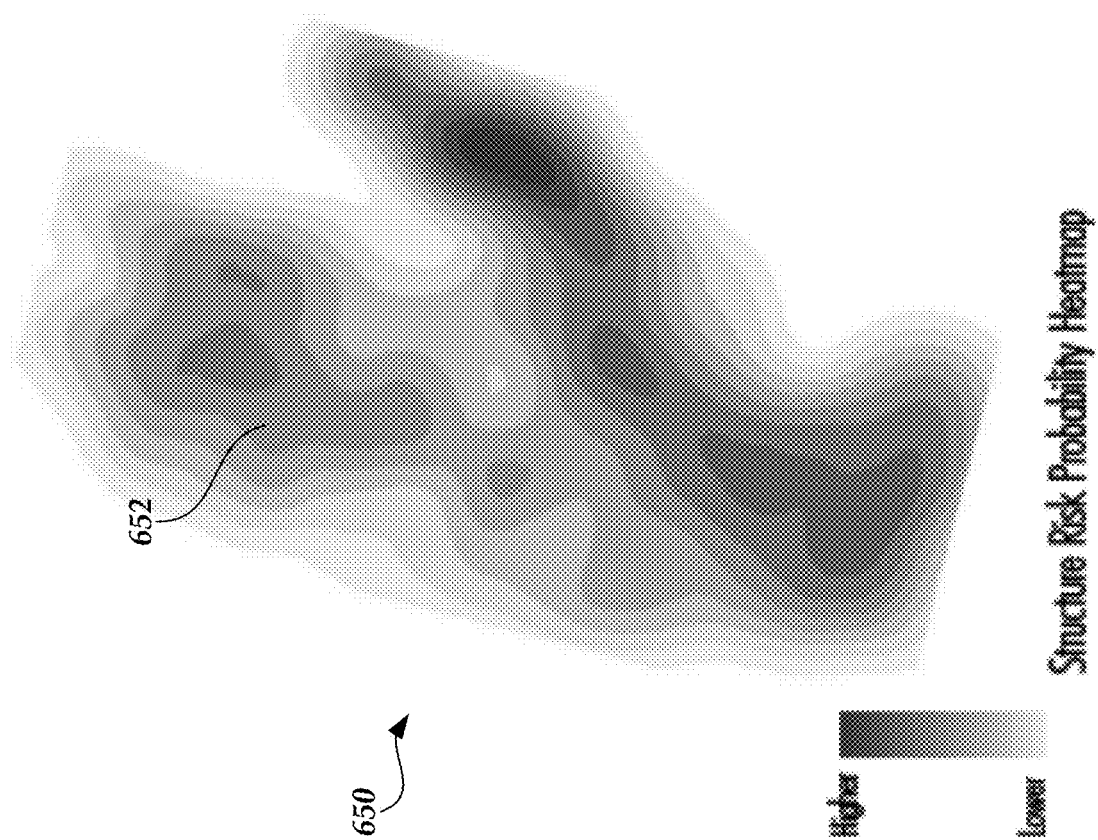
Figure 6C:
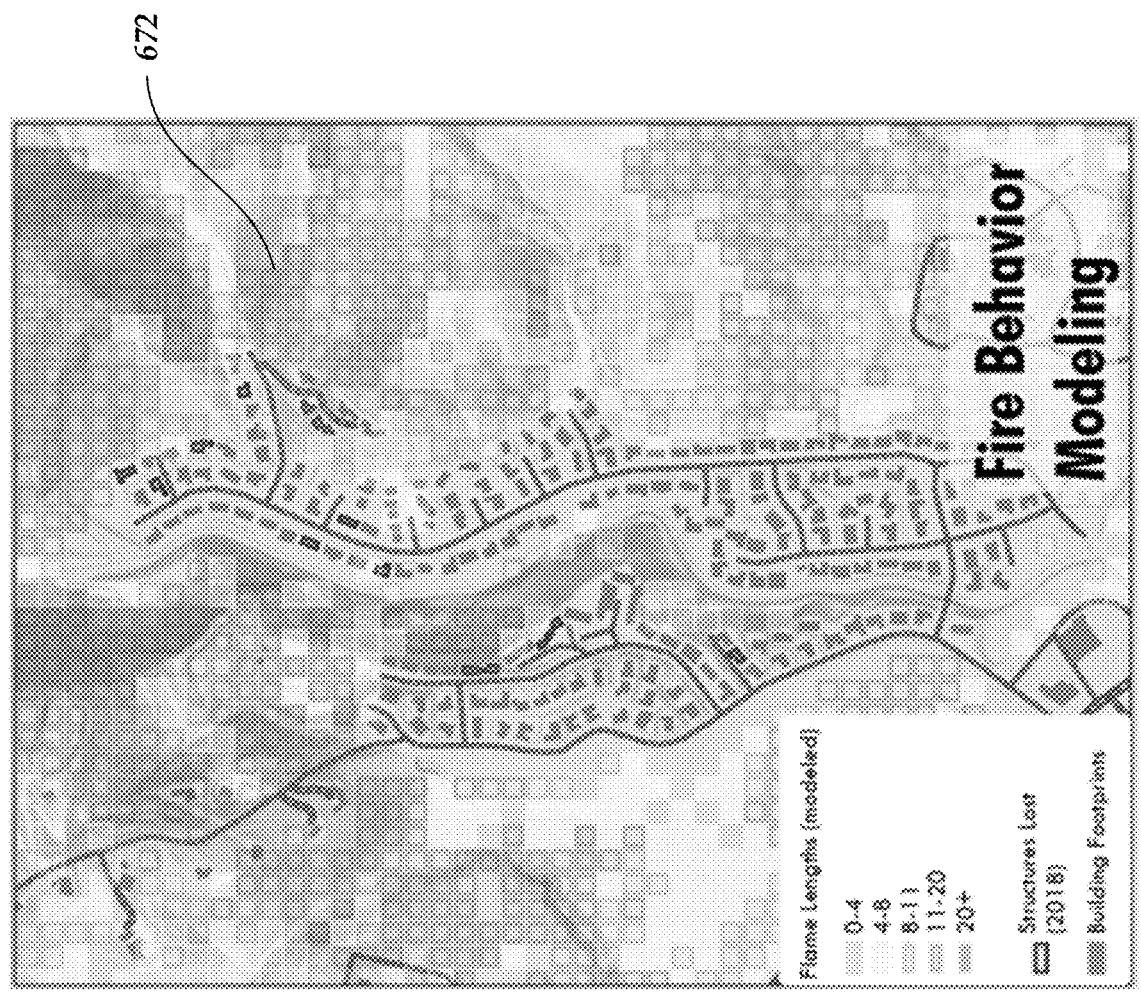

At block 712, the assessment service applies the processing result to an output format. FIGS. 6A-6C are illustrative of various outputs that can be generated, For example, FIG. 6A illustrates a color code structural risk assessment interface in which individual structures for a given geographic area 602 can be identified based on color 604 attributed to the continuous output of the risk assessment. In this example, emergency personnel can utilize the color coding to prioritize which structure present the greatest risk and how to formulate defensive strategies. FIG. 6B illustrates a heat map embodiment 650 in which structural risk is abstracted to indicated orders of magnitude 652 for assessing information about a geographic region and prioritizing defensive strategies. FIG. 6C illustrates a fire behavior risk embodiment 670 in which fire behavior risk is abstracted to indicated orders of magnitude 672 for assessing information about a geographic region and prioritizing defensive strategies. One skilled in the relevant art will appreciate that additional or alternative visualizations may be generated from the processing results. In some embodiments, the output format of the processing result can include information that can organized according to different organizational levels. For example, in one embodiment, the organizational levels can correspond to different regional categories, such as block level, neighborhood level, city level, community level, state level and the like. In this embodiment, for information accessed via the network accessible information, the assessment service 110 can generate more dynamic displays that can be accessed via a computing device. Such dynamic displays can facilitate different display parameters. At block 714, the routine 700 terminates.

At least some elements of a device of the present application can be controlled—and at least some steps of a method of the invention can be effectuated, in operation—with a programmable processor governed by instructions stored in a memory. The memory may be random access memory (RAM), read-only memory (ROM), flash memory or any other memory, or combination thereof, suitable for storing control software or other instructions and data. Those skilled in the art should also readily appreciate that instructions or programs defining the functions of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

As used herein, a phrase referring to "at least one of" a list of items refers to any combination of those items, including single members. As an example, "at least one of: a, b, or c" is intended to cover: a, b, c, a-b, a-c, b-c, and a-b-c.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a machine learning service server, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A machine learning service server can be or include a microprocessor, but in the alternative, the machine learning service server can be or include a controller, microcontroller, or state machine, combinations of the same, or the like configured to generate and publish machine learning services backed by a machine learning model. A machine learning service server can include electrical circuitry configured to process computer-executable instructions. Although described herein primarily with respect to digital technology, a machine learning service server may also include primarily analog components. For example, some or all of the modeling, simulation, or service algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a machine learning service server, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An illustrative storage medium can be coupled to the machine learning service server such that the machine learning service server can read information from, and write information to, the storage medium. In the alternative, the storage medium can be integral to the machine learning service server. The machine learning service server and the storage medium can reside in an ASIC. The ASIC can reside in a user terminal. In the alternative, the machine learning service server and the storage medium can reside as discrete components in a user terminal (e.g., access device or network service client device).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some embodiments, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some embodiments, include a signal utilized to transmit one or more representations of the information. While recited in the singular, it will be understood that a message may be composed, transmitted, stored, received, etc. in multiple parts.

As used herein, the term "correspond" encompasses a range of relative relationships between two or more elements. Correspond may refer to equality (e.g., match). Correspond may refer to partial-equality (e.g., partial match, fuzzy match, soundex). Correspond may refer to a value which falls within a range of values.

As used herein "receive" or "receiving" may include specific algorithms for obtaining information. For example, receiving may include transmitting a request message for the information. The request message may be transmitted via a network as described above. The request message may be transmitted according to one or more well-defined, machine readable standards which are known in the art. The request message may be stateful in which case the requesting device and the device to which the request was transmitted maintain a state between requests. The request message may be a stateless request in which case the state information for the request is contained within the messages exchanged between the requesting device and the device serving the request. One example of such state information includes a unique token that can be generated by either the requesting or serving device and included in messages exchanged. For example, the response message may include the state information to indicate what request message caused the serving device to transmit the response message.

As used herein "generate" or "generating" may include specific algorithms for creating information based on or using other input information. Generating may include retrieving the input information such as from memory or as provided input parameters to the hardware performing the generating. Once obtained, the generating may include combining the input information. The combination may be performed through specific circuitry configured to provide an output indicating the result of the generating. The combination may be dynamically performed such as through dynamic selection of execution paths based on, for example, the input information, device operational characteristics (e.g., hardware resources available, power level, power source, memory levels, network connectivity, bandwidth, and the like). Generating may also include storing the generated information in a memory location. The memory location may be identified as part of the request message that initiates the generating. In some embodiments, the generating may return location information identifying where the generated information can be accessed. The location information may include a memory location, network locate, file system location, or the like.

As used herein a "user interface" (also referred to as an interactive user interface, a graphical user interface or a UI) may refer to a network-based interface including data fields and/or other controls for receiving input signals or providing electronic information and/or for providing information to the user in response to any received input signals. A UI may be implemented in whole or in part using technologies such as hyper-text mark-up language (HTML), FLASH™, JAVA™, .NET™, web services, and rich site summary (RSS). In some embodiments, a UI may be included in a stand-alone client (for example, thick client, fat client) configured to communicate (e.g., send or receive data) in accordance with one or more of the aspects described.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for distributing risk assessment information comprising:

a first information distribution station corresponding to a first geographic region, the first information distribution information including first risk assessment information unique to the first geographic region, wherein the first risk assessment information corresponds to at least one of structural risk assessment associated with structures within the first geographic region and fire behavior risk associated with the first geographic region and generated by a machine learned algorithm and wherein the first risk assessment information is provided in accordance with a printed format, an electronic format provided by a locally accessible data store and network accessible format;

a second information distribution station corresponding to second geographic region, the second information distribution information including second risk assessment information unique to the second geographic region, wherein the second risk assessment information corresponds to at least one of structural risk assessment associated with structures within the second geographic region and fire behavior risk associated with the second geographic region and generated by the machine learned algorithm, and wherein the second risk assessment information is provided in accordance with a printed format, an electronic format provided by a locally accessible data store, and a network accessible format; and one or more computing devices associated with a risk assessment service, wherein the risk assessment service is configured to:

obtain requests for risk assessment information transmitted responsive to access of network accessible formats provided in at least one of the first or second information distribution station, wherein the requests include identifiers associated with the at least one of the first or second information distribution station, the identifiers generated by executing the network accessible format provided at the first information distribution station and the second information distribution station; and wherein the requests are transmitted by a computing device in accordance with an application programming interface that enables data communication with the risk assessment service after executing the corresponding network accessible format;

input data associated with the at least one of the first or second information distribution station into the machine learned algorithm, the data including geographic information and environmental information;

output, from the machine learned algorithm, risk assessment information defined by at least one of surface fire spread, flame length, crown fire activity type, crown fire initiation, and crown fire spread, the risk assessment information corresponding to a geographic region and structural characteristics of the at least one of the first or second information distribution station; and transmit risk assessment information responsive to the requests via the network accessible format associated with the at least one of the first or second information distribution station.

2. The system of claim 1, wherein the network accessible format for the first or second assessment information corresponds to a uniform resource locator.

3. The system of claim 1, wherein the first information distribution station and the second information distribution station further include a signal component configured to provide at least one visual cue.

4. The system of claim 1, wherein the first and second risk assessment information are different.

5. The system of claim 1, wherein the risk assessment service is further configured to dynamically generate the risk assessment information responsive to the requests.

6. The system of claim 1, wherein the risk assessment service is further configured to obtain information from at least one additional source responsive to the requests.

7. A system for distributing risk assessment information comprising:
- a plurality of information distribution stations, wherein individual information distribution stations are located within a defined geographic region, wherein the individual information distribution stations include risk assessment information unique to the defined geographic region, and wherein the individual information distribution stations provide the risk assessment information in a plurality of formats accessible via physical access to the individual information distribution station and a network accessible format; and
- one or more computing devices associated with a risk assessment service, wherein the risk assessment service is configured to:
  - obtain requests for risk assessment information transmitted responsive to access of network accessible formats provided in one of the plurality of information distribution stations and generated by a machine learned algorithm,
    - wherein the requests include identifiers associated with the one of the plurality of information distribution stations, the identifiers generated by executing the network accessible format provided at the first information distribution station and the second information distribution station; and
    - wherein the requests are transmitted by a computing device in accordance with an application programming interface (API) that enables data communication with the risk assessment service after executing the corresponding network accessible format;
  - input data associated with at least one of the first or second information distribution station into the machine learned algorithm, the data including geographic information and environmental information;
  - output, from the machine learned algorithm, risk assessment information defined by at least one of surface fire spread, flame length, crown fire activity type, crown fire initiation, and crown fire spread, the risk assessment information corresponding to a geographic region and structural characteristics of the at least one of the first or second information distribution station; and
  - transmit risk assessment information responsive to the requests via the API associated with the one of the plurality of information distribution stations.

8. The system of claim 7, wherein the plurality of formats accessible via physical access to the individual information distribution station include at least two of a printed format, an electronic format provided by a locally accessible data store and a network accessible format.

9. The system of claim 8, wherein the plurality of formats accessible via physical access to the individual information distribution station include the printed format, the electronic format provided by a locally accessible data store and the network accessible format.

10. The system of claim 8, wherein the network accessible format for the first or second assessment information corresponds to a uniform resource locator.

11. The system of claim 7, wherein the risk assessment information corresponds to structural risk assessment associated with structures within the geographic region.

12. The system of claim 7, wherein the risk assessment information corresponds to fire behavior risk assessment associated within the geographic region.

13. The system of claim 7, wherein plurality of information distribution stations further include a signal component configured to provide at least one visual cue.

14. The system of claim 7, wherein the plurality of information distribution stations include at least two information distribution stations including risk assessment information that is different.

15. The system of claim 7, wherein the plurality of information distribution stations include at least two information distribution stations including risk assessment information that corresponds to a same geographic region.

16. The system of claim 7, wherein the risk assessment service is further configured to dynamically generate the risk assessment information responsive to the requests.

17. The system of claim 7, wherein the risk assessment service is further configured to obtain information from at least one additional source responsive to the requests.

18. A system for distributing risk assessment information comprising:
- at least one information distribution station, wherein at least one individual information distribution station is located within a defined geographic region, wherein the at least one information distribution station includes risk assessment information unique to the defined geographic region and generated by inputting data associated with the at least one of the first information distribution station or the second information distribution station into a machine learned algorithm, the data including geographic information and environmental information, and outputting, from the machine learned algorithm, risk assessment information defined by at least one of surface fire spread, flame length, crown fire activity type, crown fire initiation, and crown fire spread, the risk assessment information corresponding to a geographic region and structural characteristics of the at least one of the first or second information distribution station, and wherein the at least one information distribution station provides the risk assessment information in a plurality of formats accessible via physical access to the at least one individual information distribution station by one or more computing devices, the plurality of formats comprising at least a network accessible format, executable by the one or more computing devices, execution of the network accessible format causing providing environmental data of the at least one information distribution station to the machine learned algorithm.

19. The system of claim 18, wherein the plurality of formats accessible via physical access to the at least one individual information distribution station include at least two of a printed format, an electronic format provided by a locally accessible data store and a network accessible format.

20. The system of claim 19, wherein the plurality of formats accessible via physical access to the at least one individual information distribution station include the printed format, the electronic format provided by a locally accessible data store and the network accessible format.

21. The system of claim 18, wherein the network accessible format for the first or second assessment information corresponds to a uniform resource locator embodied as a three-dimensional barcode.

22. The system of claim 18, wherein the first risk assessment information corresponds to structural risk assessment associated with structures within the geographic region.

23. The system of claim 18, wherein the at least one information distribution station further includes a signal component configured to provide at least one visual cue.

\* \* \* \* \*